United States Patent
Ikenaga et al.

(10) Patent No.: US 9,045,567 B2
(45) Date of Patent: Jun. 2, 2015

(54) SURFACTANT COMPOSITION FOR EMULSION POLYMERIZATION

(75) Inventors: Takayuki Ikenaga, Wakayama (JP); Masato Nomura, Wakayama (JP)

(73) Assignee: Kao Corporation, Tokyo (JP)

( * ) Notice: Subject to any disclaimer, the term of this patent is extended or adjusted under 35 U.S.C. 154(b) by 440 days.

(21) Appl. No.: 12/747,461

(22) PCT Filed: Dec. 11, 2008

(86) PCT No.: PCT/JP2008/073024
§ 371 (c)(1), (2), (4) Date: Jul. 23, 2010

(87) PCT Pub. No.: WO2009/075386
PCT Pub. Date: Jun. 18, 2009

(65) Prior Publication Data
US 2010/0305254 A1 Dec. 2, 2010

(30) Foreign Application Priority Data
Dec. 11, 2007 (JP) ................................ 2007-319242

(51) Int. Cl.
C08G 65/324 (2006.01)
C08F 2/26 (2006.01)
C08G 65/26 (2006.01)
C08G 65/326 (2006.01)

(52) U.S. Cl.
CPC .............. *C08F 2/26* (2013.01); *C08G 65/2609* (2013.01); *C08G 65/2648* (2013.01); *C08G 65/324* (2013.01); *C08G 65/326* (2013.01); C08G 2650/58 (2013.01)

(58) Field of Classification Search
CPC ........ A10N 25/30; A10N 25/04; C09K 8/584; C11D 1/29
USPC ................. 510/237, 426, 427, 428, 503, 506; 524/156; 526/211
See application file for complete search history.

(56) References Cited

U.S. PATENT DOCUMENTS

| | | | | |
|---|---|---|---|---|
| 4,259,215 A * | 3/1981 | Murata et al. | ................. | 510/329 |
| 4,293,428 A * | 10/1981 | Gale et al. | ..................... | 507/238 |
| 4,299,994 A * | 11/1981 | Stahel | .......................... | 568/625 |
| 4,395,364 A * | 7/1983 | Murata et al. | ................. | 510/352 |
| 4,879,399 A * | 11/1989 | Latella et al. | ................... | 558/34 |
| 4,983,323 A * | 1/1991 | Cox et al. | ..................... | 510/537 |
| 6,048,831 A * | 4/2000 | Mori et al. | .................... | 510/360 |
| 6,723,784 B2 * | 4/2004 | Ito et al. | ......................... | 524/556 |
| 6,802,893 B1 * | 10/2004 | Komatsu et al. | ................ | 106/31.6 |
| 6,946,437 B2 * | 9/2005 | Aizawa et al. | ................. | 510/446 |
| 7,863,479 B2 * | 1/2011 | Tropsch et al. | ................. | 562/36 |
| 8,071,521 B2 * | 12/2011 | Konishi et al. | ................. | 510/237 |
| 8,188,024 B2 * | 5/2012 | Inoue et al. | .................. | 510/128 |
| 8,309,510 B2 * | 11/2012 | Chiba et al. | .................. | 510/467 |
| 8,324,141 B2 * | 12/2012 | Nomura et al. | ................ | 510/130 |
| 2004/0048963 A1 * | 3/2004 | Sawada et al. | ................. | 524/423 |
| 2005/0106118 A1 * | 5/2005 | Sakuma et al. | ............. | 424/70.24 |
| 2008/0207939 A1 * | 8/2008 | Tropsch et al. | .................. | 558/34 |
| 2009/0124523 A1 | 5/2009 | Dol et al. | | |
| 2010/0144586 A1 * | 6/2010 | Nomura et al. | ................ | 510/535 |
| 2010/0160206 A1 * | 6/2010 | Chiba et al. | .................... | 510/467 |
| 2010/0305254 A1 * | 12/2010 | Ikenaga et al. | ................. | 524/156 |
| 2012/0115769 A1 * | 5/2012 | Nomura et al. | ................ | 510/351 |

FOREIGN PATENT DOCUMENTS

| | | | |
|---|---|---|---|
| EP | 1033166 A2 | | 9/2000 |
| EP | 2163603 A1 | | 3/2010 |
| EP | 2218768 | * | 8/2010 |
| EP | 2218768 A1 | | 8/2010 |
| JP | 56-72092 A | | 6/1981 |
| JP | 1-41199 B2 | | 9/1989 |
| JP | 2001-72703 A | | 3/2001 |
| JP | 2002-80506 A | | 3/2002 |
| JP | 2002-88104 A | | 3/2002 |
| JP | 2006-232947 A | | 9/2006 |
| JP | 2009-155511 | * | 7/2009 |
| WO | WO 2007/052657 A1 | | 5/2007 |
| WO | WO 2009/008542 A1 | | 1/2009 |

OTHER PUBLICATIONS

Scifinder Structure search. No Author. Performed by the Office on Apr. 18, 2014.*
Ozaka et al. English translation of JP 2009-155511. Obtained from AIPN/JPO website on Apr. 18, 2014.*
International Preliminary Report on Patentability and Written Opinion of the International Searching Authority (Forms PCT/IB/338, PCT/IB/373 and PCT/ISA/237) mailed Aug. 19, 2010 for International Application No. PCT/JP2008/073024.
Chinese Office Action for Chinese Application No. 200880120116.1 dated Feb. 2, 2012 with English translation.
The Communication with an extended Search Report, dated Jul. 31, 2014, issued in the corresponding European Patent Application No. 08859313.2.

* cited by examiner

*Primary Examiner* — Mark Eashoo
*Assistant Examiner* — Michael A Salvitti
(74) *Attorney, Agent, or Firm* — Birch Stewart Kolasch & Birch, LLP

(57) ABSTRACT

The present invention provides a surfactant composition for emulsion polymerization containing an alkyl ether sulfate represented by formula (1) and a method for producing a polymer emulsion including emulsion polymerization of a monomer in the presence of the surfactant composition for emulsion polymerization:

$$RO-(PO)_m(EO)_n SO_3 M \qquad (1)$$

wherein, R represents an alkyl group having 8 to 24 carbon atoms; PO represents a propyleneoxy group; EO represents an ethyleneoxy group; m represents a number satisfying $0 < m < 1$; n represents a number satisfying $1 \leq n \leq 30$, PO and EO being block added in this order; and M represents a cation.

10 Claims, No Drawings

SURFACTANT COMPOSITION FOR EMULSION POLYMERIZATION

FIELD OF THE INVENTION

The present invention relates to a surfactant composition for emulsion polymerization and a method for producing a polymer emulsion using the same.

BACKGROUND OF THE INVENTION

Polymer emulsions produced by emulsion polymerization of vinyl monomers such as vinyl acetate and acrylate esters are widely used in industry. For example, a polymer emulsion is used as it is in the fields of coating, adhesive, paper modification, and fiber modification, or a polymer separated from a polymer emulsion is used for plastics and rubbers. In emulsion polymerization, as an emulsifier, anionic surfactants such as linear alkylsulfates, linear alkylbenzenesulfonates, polyoxyethylene alkyl ether sulfates, and polyoxyethylene alkylphenyl ether sulfates and nonionic surfactants such as polyoxyethylene linear alkyl ethers, polyoxyethylene alkylphenyl ethers are used alone or as a mixture of anionic/nonionic surfactants.

The emulsifier in emulsion polymerization has much influence not only on initiation of the polymerization and growth of polymer but also on stability of the polymer emulsion during polymerization (polymerization stability) and mechanical, chemical, freeze, and storage stabilities of the resultant polymer emulsion. Surfactants used for emulsion polymerization are required to exhibit good performance on polymerization stability, to produce a polymer emulsion having good mechanical and chemical stabilities, a small particle diameter, and low viscosity, and to cause no environmental problem, and the like.

JP-A-2001-72703 describes a polyoxyethylene alkyl ether sulfate as a surfactant for emulsion polymerization having a small influence on environment.

JP-A-56-72092 (JP-B1-41199) describes a polyoxyalkylene alkyl ether sulfate containing a propyleneoxy group and an ethyleneoxy group as a surfactant for emulsion polymerization.

SUMMARY OF THE INVENTION

The present invention provides a surfactant composition for emulsion polymerization, containing an alkyl ether sulfate represented by formula (1):

wherein, R represents an alkyl group having 8 to 24 carbon atoms; PO represents a propyleneoxy group; EO represents an ethyleneoxy group; m represents an average PO addition mole number satisfying $0<m<1$; n represents an average EO addition mole number satisfying $1\leq n\leq 30$, PO and EO being block added in this order; and M represents a cation.

The present invention provides a method for producing a polymer emulsion, including emulsion polymerization of a monomer in the presence of a surfactant composition for emulsion polymerization containing an alkyl ether sulfate represented by formula (1):

wherein, R represents an alkyl group having 8 to 24 carbon atoms; PO represents a propyleneoxy group; EO represents an ethyleneoxy group; m represents an average PO addition mole number satisfying $0<m<1$; n represents an average EO addition mole number satisfying $1\leq n\leq 30$, PO and EO being block added in this order; and M represents a cation.

The present invention also relates to use of the composition or a composition produced by the method as a surfactant for emulsion polymerization.

DETAILED DESCRIPTION OF THE INVENTION

The surfactant for emulsion polymerization of JP-A-2001-72703 does not exhibit fully satisfactory performance on stability of a polymer emulsion during polymerization (polymerization stability) or produce a polymer emulsion having fully satisfactory mechanical and chemical stabilities.

From the viewpoint of carbon neutrality, there is currently increasing global demand for natural alcohols. However, surfactants produced from natural alcohols have disadvantages that these are inferior to surfactants produced from synthetic alcohols in polymerization stability when used for emulsion polymerization and have poor low temperature stability by themselves.

The present invention is thus to provide a surfactant composition for emulsion polymerization using, as a starting material, an alcohol having a small influence on environment such as a natural alcohol, the surfactant exhibiting good polymerization stability and producing a polymer emulsion having good mechanical and chemical stabilities.

The surfactant composition for emulsion polymerization of the present invention can be produced from an alcohol having a small influence on environment. Use of the surfactant composition for emulsion polymerization of the present invention provides the production of a polymer emulsion having good polymerization and mechanical stabilities, a small average polymer particle diameter, and a good chemical stability.

[Surfactant Composition for Emulsion Polymerization]

The surfactant composition for emulsion polymerization of the present invention contains the alkyl ether sulfate represented by formula (1).

From the viewpoint of producing a polymer emulsion having good polymerization stability and a small particle diameter, in formula (1), R represents an alkyl group having 8 to 24 carbon atoms, preferably 8 to 18 carbon atoms, more preferably 10 to 18 carbon atoms, even more preferably 12 to 18 carbon atoms, and even more preferably 12 to 14 carbon atoms. From the environmental viewpoint of carbon neutrality, R preferably represents a linear alkyl group derived from a starting oil-and-fat, and more preferably the linear alkyl group having 12 to 18 carbon atoms.

In formula (1), m represents an average PO addition mole number. From the viewpoint of good polymerization stability of the polymer emulsion, m is the number of more than 0 and less than 1, and from the viewpoint of reactivity in production, preferably 0.1 to 0.9, more preferably 0.2 to 0.8, and even more preferably 0.4 to 0.8.

In formula (1), n represents an average EO addition mole number. From the viewpoint of a good chemical stability of the polymer emulsion, n is the number of 1 to 30, and, from the viewpoints of the polymerization stability and the chemical stability, preferably 1 to 25, more preferably 2 to 20, even more preferably 3 to 20, even more preferably 4 to 20, and even more preferably 4 to 18.

Considering reactivity in production and emulsion polymerization performance in a comprehensive way, an average PO addition mole number and an average EO addition mole number, m and n, are preferably m of 0.1 to 0.9 and n of 1 to 30, more preferably m of 0.2 to 0.8 and n of 2 to 20, and even more preferably m of 0.4 to 0.8 and n of 4 to 20.

In formula (1), M represents a cation, including alkaline metal ions, alkaline earth metal ions, ammonium ions, and alkanolammonium ions such as triethanolammonium ion. Examples of the alkaline metal include sodium, potassium, and lithium. Examples of the alkaline earth metal include calcium. Among them, preferred are sodium and potassium, and more preferred is sodium.

The surfactant composition for emulsion polymerization of the present invention is characterized by containing the alkyl ether sulfate represented by formula (1). Use of the composition allows production of a polymer emulsion having a small influence on environment, a good polymerization stability and a good mechanical stability, a small average polymer particle diameter, and good chemical stability.

No reason for the significant advantageous effects of the present invention is not made evident in details. It is considered that the alkyl ether sulfate used in the present invention has a slightly branched structure due to addition of a propyleneoxy group within the range of 0<m<1 of an average mole number adjacent to a structural unit derived from an alcohol and for this reason the composition of the present invention can have an increased adsorptive property onto the surface of a monomer, resulting in the advantageous effects of the present invention.

The alkyl ether sulfate represented by formula (1) can be produced by any method without specific limitation, for example, by a method including the following steps (I) to (III):

step (I): adding propylene oxide to an alcohol having an alkyl group having 8 to 24 carbon atoms within the range of more than 0 mole to less than 1 mole on an average per mole of the alcohol;

step (II): adding ethylene oxide to the resulting propylene oxide adduct of the step (I) in the range of not less than 1 mole to not more than 30 moles on an average; and step (III): sulfating and then neutralizing the resulting alkoxylate of the step (II).

The surfactant composition for emulsion polymerization of the present invention, particularly the composition containing the alkyl ether sulfate represented by formula (1) and produced by the method including the steps (I) to (III) may be a mixture with compounds represented by the following formulae (2) to (5).

RO—SO$_3$M (2)

RO—(PO)$_x$SO$_3$M (3)

RO-(EO)$_y$SO$_3$M (4)

RO—(PO)$_z$(EO)$_{z'}$SO$_3$M (5)

in formulae (2) to (5), R and M represent the same meanings as in formula (1); and x, y, z, and z' each represent an integer of not less than 1.

The step (I) is to add propylene oxide to an alcohol having an alkyl group, preferably a linear alkyl group having 8 to 24 carbon atoms in the range of more than 0 mole to less than 1 mole on an average. The alkyl group of the alcohol used in the present invention has 8 to 24 carbon atoms, and for the reasons of versatility and easy handling of a starting material, preferably 8 to 18 carbon atoms, more preferably 10 to 18 carbon atoms, even more preferably 12 to 18 carbon atoms, and even more preferably 12 to 14 carbon atoms. From the viewpoint of performances such as emulsifying power to monomer, the alkyl group is preferably linear.

An amount of propylene oxide used per mole of the alcohol is preferably so large to produce the alkyl ether sulfate represented by formula (1). More specifically, an average addition mole number of propylene oxide per mole of the alcohol is more than 0 and less than 1, and from the viewpoint of reactivity in production, preferably 0.1 to 0.9 mole, more preferably 0.2 to 0.8 mole, and even more preferably 0.4 to 0.8 mole.

The step (II) is a step to add ethylene oxide to the resultant propylene oxide adduct of the step (I) in the range of not less than 1 mole to not more than 30 moles on an average. An amount of ethylene oxide used per mole of the alcohol is preferably sufficient for producing the alkyl ether sulfate represented by formula (1). More specifically, an average addition mole number of ethylene oxide per mole of the alcohol is not less than 1 mole and not more than 30 moles, and from the viewpoints of polymerization stability and chemical stability of the polymer emulsion, preferably 1 to 25 moles, more preferably 2 to 20 moles, even more preferably 4 to 20 moles, and even more preferably 4 to 18 moles.

The steps (I) and (II) can be conducted by a known method. That is, the steps can be conducted by heating and dehydrating the alcohol and a catalyst such as KOH in an amount of 0.5 to 1% by mol to the alcohol in an autoclave, adding predetermined amounts of propylene oxide and ethylene oxide to the alcohol and reacting them at 130° C. to 160° C. to produce an adduct. In this reaction, an addition mode is block addition in the order of addition of propylene oxide [step (I)] and addition of ethylene oxide [step (II)]. The autoclave used is preferably equipped with a stirrer, a temperature controller, and an automatic introduction device.

For sulfating in the step (III), methods of using sulfur trioxide (liquid or gas), sulfur trioxide-containing gas, fuming sulfuric acid, and chlorosulfonic acid can be employed. From the viewpoint of preventing particularly generation of waste sulfuric acid and waste hydrochloric acid, preferred is a method of continuously supplying sulfur trioxide together with an alkoxylate in the state of gas or liquid.

For neutralizing the sulfated product, examples of the method include batch methods of adding the sulfated product to a given amount of neutralizer and stirring to neutralize and continuous methods of continuously supplying the sulfated product and a neutralizer into a pipe and neutralizing with a stirring mixer. In the present invention, the method for neutralizing is not particularly limited. Examples of the neutralizer used in this step include alkaline metal aqueous solutions, ammonia water, and triethanolamine. Preferred are alkaline metal aqueous solutions, and more preferred is a sodium hydroxide aqueous solution.

From the viewpoint of ease of handling, the surfactant composition for emulsion polymerization of the present invention is preferably produced and used in the state of aqueous solution or aqueous paste. The composition may be composed of only the alkyl ether sulfate represented by formula (1), or the alkyl ether sulfate represented by formula (1) and water.

In the surfactant composition for emulsion polymerization of the present invention, a content of the alkyl ether sulfate represented by formula (1) is preferably 30 to 100% by weight, more preferably 40 to 100% by weight, and even more preferably 50 to 100% by weight.

[Method for Producing Polymer Emulsion]

The method for producing polymer emulsion of the present invention includes emulsion-polymerizing a monomer in the presence of the surfactant composition of the present invention. The monomer used in the present invention is preferably a vinyl monomer. From the viewpoint of polymerization stability and chemical stability, in the method for producing the polymer emulsion of the present invention, a range of n of the surfactant composition represented by formula (I) is preferably 3 to 30, more preferably 3 to 25, even more preferably 3 to 20, even more preferably 4 to 20, and even more preferably 4 to 18.

Specific examples of the monomer used in the present invention include aromatic vinyl monomers such as styrene, α-methylstyrene, and chlorostyrene; acrylates such as methyl acrylate, ethyl acrylate, butyl acrylate, and 2-ethylhexyl acrylate; methacrylates such as methyl methacrylate and ethyl methacrylate; carboxyl group-containing vinyl monomers such as acrylic acid and methacrylic acid; vinyl halides and vinylidene halides such as vinyl chloride, vinyl bromide, and vinylidene chloride; vinyl esters such as vinyl acetate and vinyl propionate; nitriles such as acrylonitrile and methacrylonitrile; and conjugated dienes such as butadiene and isoprene. These monomers may be used alone for homopolymerization or in combination for copolymerization.

In the method of the present invention, the surfactant composition of the present invention is preferably used in an amount of 0.1 to 20 parts by weight, and more preferably 0.5 to 5 parts by weight with respect to 100 parts by weight of the monomer.

Any polymerization initiator generally used in emulsion polymerization can be used as a polymerization initiator in the method for producing the polymer emulsion of the present invention. Examples of the polymerization initiator include persulfates such as potassium persulfate and ammonium persulfate, organic peroxides such as hydrogen peroxide, t-butyl hydroperoxide, benzoyl peroxide, and cumene hydroperoxide, and azo initiators such as azobisisobutyronitrile and 2,2-azobis (2-amidinopropane) dihydrochloride. Preferred are persulfates. Redox initiators containing peroxides and reductants such as sodium sulfite, Rongalit, and ascorbic acid together may also be used.

In the method for producing the polymer emulsion of the present invention, conditions for emulsion polymerization are not specifically limited. An amount of the monomer is preferably 20 to 70% by weight, and more preferably 40 to 60% by weight of the total reaction system. For adding the monomer, any method can be used, including a method of dropping the monomer, a method of charging the monomer all at once, and a method of pre-emulsifying. From the viewpoint of polymerization stability, a method of pre-emulsifying is preferred.

In the method of pre-emulsifying, time of dropping a pre-emulsion is preferably 1 to 8 hours, and time of aging is preferably 1 to 5 hours. A polymerization temperature may be controlled according to a decomposition temperature of an initiator and is preferably 50 to 90° C. When the initiator is a persulfate, it is preferably 70° C. to 85° C.

EXAMPLES

The following Examples are intended to illustrate and compare the present invention and not to limit the present invention.

In Examples, the "%" refers to "% by weight" unless otherwise specified.

Production Example 1

In an autoclave equipped with a stirrer, a temperature controller, and an automatic introduction device, 1377.8 g of C12 linear alcohol (Kao Corporation, product name: Kalcol 2098), 536.4 g of C14 linear alcohol (Kao Corporation, product name: Kalcol 4098), and 2.72 g of KOH were dehydrated for 30 minutes at 110° C. and 1.3 kPa. Then, the inner atmosphere was replaced with nitrogen. The reaction mixture was heated to 120° C., added with 230 g of propylene oxide, and reacted to produce an adduct and aged at 120° C. The reaction mixture was heated to 145° C., added with 3490 g of ethylene oxide, and reacted to produce an adduct and aged at 145° C. The reaction mixture was cooled to 80° C. Unreacted ethylene oxide was removed at 4.0 kPa. Then, 2.91 g of acetic acid was added to the autoclave and stirred for 30 minutes at 80° C. The mixture was taken out to obtain an alkoxylate in which an average PO addition mole number was 0.4 and an average EO addition mole number was 8.

The resultant alkoxylate was sulfated with $SO_3$ gas in a falling thin film reactor.

The sulfated product was neutralized with an aqueous NaOH solution to give an alkyl ether sulfate sodium salt composition (a-1).

Production Example 2

An alkyl ether sulfate sodium salt composition (a-2) was prepared in the same way as in Production Example 1, except that 826.7 g of C12 linear alcohol (Kao Corporation, product name: Kalcol 2098), 321.8 g of C14 linear alcohol (Kao Corporation, product name: Kalcol 4098), 1.63 g of KOH, 138 g of propylene oxide, 4711.5 g of ethylene oxide, and 1.75 g of acetic acid were used. In the composition (a-2), an average PO addition mole number was 0.4 and an average EO addition mole number was 18.

Production Example 3

An alkyl ether sulfate sodium salt composition (a-3) was prepared in the same way as in Production Example 1, except that 2790 g of C12 linear alcohol (Kao Corporation, product name: Kalcol 2098), 4.2 g of KOH, 522 g of propylene oxide, 2640 g of ethylene oxide, and 4.5 g of acetic acid were used. In the composition (a-3), an average PO addition mole number was 0.6 and an average EO addition mole number was 4.

Production Example 4

An alkyl ether sulfate sodium salt composition (a-4) was similarly prepared as in Production Example 1, except that 1116 g of C12 linear alcohol (Kao Corporation, product name: Kalcol 2098), 1.68 g of KOH, 278.4 g of propylene oxide, 5280 g of ethylene oxide, and 1.8 g of acetic acid were used. In the composition (a-4), an average PO addition mole number was 0.8 and an average EO addition mole number was 20.

Examples 1 to 4 and Comparative Examples 1 to 3 and 9

Polymer emulsions were prepared by emulsion polymerization of monomers using inventive surfactant compositions (a-1) to (a-4) and comparative surfactants (b-1) to (b-4) by the method described below. The resultant polymer emulsions were evaluated for performances according to the method described below. Results are shown in Table 1.

(a-1): alkyl ether sulfate sodium salt composition prepared in Production Example 1

(a-2): alkyl ether sulfate sodium salt composition prepared in Production Example 2

(a-3): alkyl ether sulfate sodium salt composition prepared in Production Example 3

(a-4): alkyl ether sulfate sodium salt composition prepared in Production Example 4

(b-1): polyoxyethylene (3) dodecyl ether sulfate sodium salt (b-2): polyoxyethylene (10) polyoxypropylene (3) C12-C14 saturated secondary alcohol ether sulfate sodium salt (10 moles of ethyleneoxy groups and 3 moles of propyleneoxy groups are added as blocks in this order)

(b-3): polyoxypropylene (2) polyoxyethylene (4) dodecyl ether sulfate sodium salt (2 propyleneoxy groups and 4 ethyleneoxy groups are added as blocks in this order)

(b-4): polyoxypropylene (0.5) polyoxyethylene (2.5) alkyl ether sulfate sodium salt (an average carbon number of alkyl group is 14.5, derived from synthetic alcohol having 36% iso ratio, 0.5 mole of propyleneoxy group and 2.5 moles of ethyleneoxy groups are added as blocks in this order)

<Method of Emulsion Polymerization>

In a 1 L flask having an inlet port for starting material and equipped with a stirrer, 112.5 g of ion-exchanged water, 0.36 g of potassium persulfate as a polymerization initiator, and 3.6 g of a surfactant compositions of the invention or a comparative surfactant were mixed and stirred at 500 r/min. To the mixture was added dropwise a monomer mixture of 109.7 g of butyl acrylate, 109.7 g of styrene, and 5.6 g of acrylic acid for about 5 minutes, and stirred for 30 minutes to produce an emulsion liquid.

In a 1 L separable flask having an inlet port for starting material and equipped with a stirrer and a reflux condenser, 162.5 g of ion-exchanged water, 0.09 g of potassium persulfate as a polymerization initiator, 0.90 g of a surfactant composition of the invention or a comparative surfactant, and 5% (17.1 g) of the emulsion liquid were mixed and heated to 80° C. to effect a first polymerization for 30 minutes. To the reaction mixture was added dropwise the rest of the emulsion liquid for 3 hours and the mixture was aged for additional 1 hour. The resultant polymer emulsion was cooled to 30° C. or lower, filtered through a 200-mesh stainless wire netting to collect aggregates in the emulsion. Aggregates adhered to the inner wall of the flask and an agitating blade were also collected.

<Evaluation for Performances>

(1) Polymerization Stability in Emulsion Polymerization

Collected aggregates were washed with water, dried for 2 hours at 105° C. under 26.6 kPa, and weighed to determine an amount of aggregates. A polymerization stability was represented by a percentage by weight of aggregates to the total weight of the monomers used. The smaller the value, the better the polymerization stability.

(2) Average Particle Diameter of Particles in Polymer Emulsion

The resultant polymer emulsion was neutralized with 25% aqueous ammonia to pH 8 to 9. Using a dynamic light scattering particle size analyzer model N4 Plus (Beckman Coulter, Inc.), an average particle diameters of particles in the neutralized polymer emulsions was measured. The smaller average particle diameter refers to the better polymer emulsion.

(3) Mechanical Stability of Polymer Emulsion 50 g of the neutralized polymer emulsion was rotated for 5 minutes with a Maron mechanical stability tester under the conditions of 98 N and 1000 r/min. Generated aggregates were filtered through a 200-mesh stainless wire netting. A filter residue was washed with water, dried for 2 hours at 105° C. under 26.6 kPa, and weighed to determine an amount % by weight of aggregates to the polymer. The smaller the value, the better the mechanical stability.

(4) Chemical Stability of Polymer Emulsion

The polymer emulsion was diluted with ion-exchanged water to 3% of polymer concentration and titrated with 1 mol/L calcium chloride in water to determine a concentration of calcium chloride at which aggregates generate. The larger the value is, the better the chemical stability is.

TABLE 1

| | | Surfactant composition | Polymerization stability (%) | Average particle diameter (nm) | Mechanical stability (%) | Chemical stability ($CaCl_2$ mmol/L) |
|---|---|---|---|---|---|---|
| Example | 1 | (a-1) | 0.024 | 129 | 0.018 | 100 |
| | 2 | (a-2) | 0.046 | 144 | 0.032 | 400 |
| | 3 | (a-3) | 0.035 | 120 | 0.026 | 60 |
| | 4 | (a-4) | 0.052 | 145 | 0.037 | 420 |
| Comparative example | 1 | (b-1) | 0.11 | 133 | 0.17 | 20 |
| | 2 | (b-2) | 0.21 | 151 | 0.26 | 90 |
| | 3 | (b-3) | 0.13 | 135 | 0.22 | 30 |
| | 9 | (b-4) | 0.24 | 112 | 0.54 | 20 |

Examples 5 to 8 and Comparative Examples 4 to 6 and 10

Polymer emulsions were prepared by emulsion polymerization under the same conditions as in Examples 1 to 4 and Comparative Examples 1 to 3 and 9, except that inventive surfactant compositions and comparative surfactants shown in Table 2, and 110.8 g of butyl acrylate, 110.8 g of methyl methacrylate, and 3.4 g of acrylic acid as monomers were used. The polymer emulsions were similarly evaluated for performance. Results are shown in Table 2.

TABLE 2

|  |  | Surfactant composition | Polymerization stability (%) | Average particle diameter (nm) | Mechanical stability (%) | Chemical stability ($CaCl_2$ mmol/L) |
|---|---|---|---|---|---|---|
| Example | 5 | (a-1) | 0.027 | 119 | 0.033 | 110 |
|  | 6 | (a-2) | 0.032 | 130 | 0.056 | 400 |
|  | 7 | (a-3) | 0.023 | 113 | 0.048 | 60 |
|  | 8 | (a-4) | 0.039 | 132 | 0.028 | 410 |
| Comparative example | 4 | (b-1) | 0.12 | 124 | 0.19 | 20 |
|  | 5 | (b-2) | 0.24 | 142 | 0.51 | 90 |
|  | 6 | (b-3) | 0.16 | 127 | 0.23 | 20 |
|  | 10 | (b-4) | 0.22 | 110 | 0.46 | 20 |

Examples 9 to 10 and Comparative Examples 7 to 8 and 11

Polymer emulsions were prepared by emulsion polymerization under the same conditions as in Examples 1 to 4 and Comparative Examples 1 to 3 and 9, except that inventive surfactant compositions and comparative surfactants shown in Table 3, and 110.8 g of butyl acrylate, 110.8 g of 2-ethylhexyl acrylate, and 3.4 g of acrylic acid as monomers were used. The polymer emulsions were similarly evaluated for performance. Results are shown in Table 3.

TABLE 3

|  |  | Surfactant composition | Polymerization stability (%) | Average particle diameter (nm) | Mechanical stability (%) | Chemical stability ($CaCl_2$ mmol/L) |
|---|---|---|---|---|---|---|
| Example | 9 | (a-1) | 0.028 | 143 | 0.041 | 120 |
|  | 10 | (a-2) | 0.045 | 151 | 0.034 | 430 |
| Comparative example | 7 | (b-1) | 0.14 | 149 | 0.20 | 30 |
|  | 8 | (b-2) | 0.25 | 156 | 0.45 | 100 |
|  | 11 | (b-4) | 0.27 | 129 | 0.33 | 20 |

The invention claimed is:

1. A surfactant composition for emulsion polymerization, comprising an alkyl ether sulfate represented by formula (1):

$$RO-(PO)_m(EO)_nSO_3M \quad (1)$$

wherein, R represents a linear alkyl group having 8 to 24 carbon atoms; PO represents a propyleneoxy group; EO represents an ethyleneoxy group; m represents an average PO addition mole number satisfying $0<m\leq0.8$; n represents an average EO addition mole number satisfying $8\leq n\leq30$, PO and EO being block added in this order; and M represents a cation.

2. The surfactant composition for emulsion polymerization according to claim 1, wherein R represents a linear alkyl group having 12 to 18 carbon atoms.

3. A method for producing a polymer emulsion, comprising emulsion polymerization of a monomer in the presence of a surfactant composition for emulsion polymerization comprising an alkyl ether sulfate represented by formula (1):

$$RO-(PO)_m(EO)_nSO_3M \quad (1)$$

wherein, R represents a linear alkyl group having 8 to 24 carbon atoms; PO represents a propyleneoxy group; EO represents an ethyleneoxy group; m represents an average PO addition mole number satisfying $0<m\leq0.8$; n represents an average EO addition mole number satisfying $8\leq n\leq30$, PO and EO being block added in this order; and M represents a cation.

4. The method according to claim 3, wherein R represents a linear alkyl group having 12 to 18 carbon atoms.

5. The method according to claim 3, wherein n is a number satisfying $8\leq n\leq20$.

6. The method according to claim 3, wherein R represents a linear alkyl group having 8 to 18 carbon atoms, and n is a number satisfying $8\leq n\leq18$.

7. The method according to claim 3, wherein the monomer is a vinyl monomer.

8. The surfactant composition for emulsion polymerization according to claim 1, wherein m represents an average PO addition mole number satisfying $0<m\leq0.6$.

9. The surfactant composition for emulsion polymerization according to claim 1, wherein m represents an average PO addition mole number satisfying $0<m\leq0.4$.

10. The surfactant composition for emulsion polymerization according to claim 1, wherein R represents a linear alkyl group having 12 or 14 carbon atoms.

* * * * *